(No Model.)
J. A. PARKS & G. V. SHEFFIELD.
DRILL CHUCK.
No. 260,314. Patented June 27, 1882.
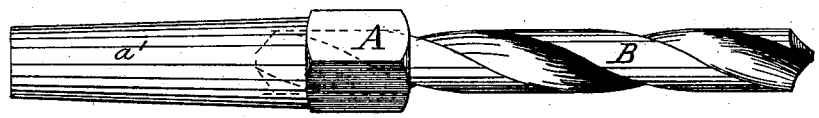
Fig. 1
Fig. 2
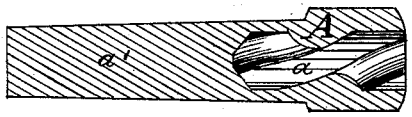   
Fig. 3   Fig. 4
Witnesses.
J. T. Thurston
Philip E. Raqué
Inventors.
John A. Parks
George V. Sheffield
By their attorney
M. Randolph

UNITED STATES PATENT OFFICE.

JOHN A. PARKS AND GEORGE V. SHEFFIELD, OF NEW YORK, N. Y.; SAID SHEFFIELD ASSIGNOR TO SAID PARKS.

DRILL-CHUCK.

SPECIFICATION forming part of Letters Patent No. 260,314, dated June 27, 1882.

Application filed September 29, 1881. (No model.)

*To all whom it may concern:*

Be it known that we, JOHN A. PARKS and GEORGE V. SHEFFIELD, both of the city of New York, in the county and State of New York, have invented a new and useful Improvement in a Drill-Chuck; and we hereby declare the following to be a full and clear description of the same.

The nature of this invention consists in forming a drill-chuck so as to hold a double-ended twist-drill without injury to the drill and with perfect steadiness and precision of movement in use. The chuck is formed of a piece of cast metal, cast on a former so as to fit the drill for which it is intended and permit the drill to be screwed into the chuck when it is ready for use. This chuck and the drill to be used with it become new articles of manufacture.

The invention will be readily understood by reference to the accompanying drawings, of which Figure 1 is an elevation of the chuck and the drill put together as in use. Fig. 2 is an elevation of the drill. Fig. 3 is a sectional elevation of the chuck. Fig. 4 is an end elevation of the chuck.

The chuck A may be formed of any suitable cast metal cast on a former, so that the mortise or socket $a$ may fit the drill B, which is to be screwed into it. The former on which the mortise or socket $a$ is cast, however, must be slightly larger than the drill, so that the drill may be easily turned into and out of the chuck with the fingers. The shank $a'$ of the chuck will be turned up true, either cylindrical or slightly conical in form, so as to readily fit the lathe or drill in which this tool is to be used.

The drill B will be of the ordinary "twist" pattern, except that it will be made double-ended, and one of the ends may be made larger than the other, so as to arrange for a clearance and a tap-drill on the same piece or tool, or for any similar purpose.

Of course both ends of the drill may be of the same size; but in any event the advantages of using and being able to hold a double-ended twist-drill are very great, besides the one leading feature of economy. By having a twist-drill fitted with one of these easily adjustable and removable chucks an ordinary ratchet-drill may be fitted with these valuable tools, and the working of the ratchet-drill thereby be very greatly improved for many uses.

Having described our invention, we claim—

1. The chuck A, formed of solid cast metal and provided with a socket, $a$, for the drill-tool and a shank, $a'$, for attaching it to the lathe or drill, substantially as described.

2. As a new article of manufacture, a socketed drill-chuck, A, in combination with a double-ended twist-drill, B, substantially as described and set forth.

JOHN A. PARKS.
GEORGE V. SHEFFIELD.

Witnesses:
M. RANDOLPH,
J. B. THURSTON.